United States Patent [19]
Schwarz et al.

[11] 3,805,984
[45] Apr. 23, 1974

[54] MOTORCYCLE CARRIER

[76] Inventors: Gail B. Schwarz, 513 E. B. St.;
James F. Friederich, 619 S. High
St., both of Belleville, Ill. 62221

[22] Filed: Feb. 12, 1973

[21] Appl. No.: 331,867

[52] U.S. Cl. ............................................. 214/450
[51] Int. Cl. ............................................... B60r 9/00
[58] Field of Search ...................... 214/450, 451, 454;
224/42.03 B, 42.08, 42.03 R

[56] References Cited
UNITED STATES PATENTS
3,720,333   3/1973   Vaughn ........................... 214/450
3,724,694   4/1973   Wilson ............................. 214/450

Primary Examiner—Gerald M. Forlenza
Assistant Examiner—John Mannix
Attorney, Agent, or Firm—John D. Pope, III

[57] ABSTRACT

A motorcycle carrier attachable to a motor vehicle includes a motorcycle support assembly that is detachably coupled to a hitch member on the motor vehicle for removal and reinstallation without tools. The motorcycle support assembly includes a loading and support member that can pivot about the hitch member in seesaw fashion during loading and unloading of a motorcycle on and from the support member. Frictional members associated with the hitch member and support member are held in forcible contact by the weight of the motorcycle on the support member, thereby establishing a frictional drag force on the support member when it is pivoted. The drag force restrains free pivotal movement of the support member and facilitates motorcycle loading and unloading on and from the support member.

13 Claims, 6 Drawing Figures

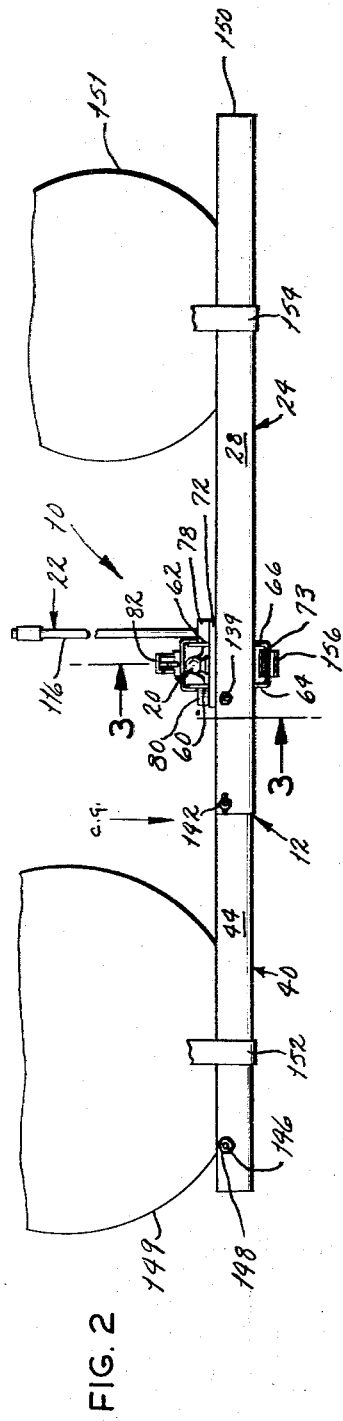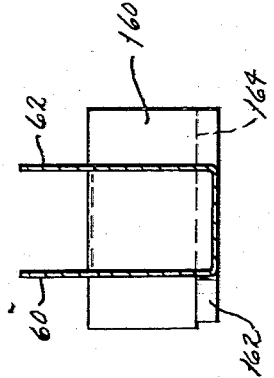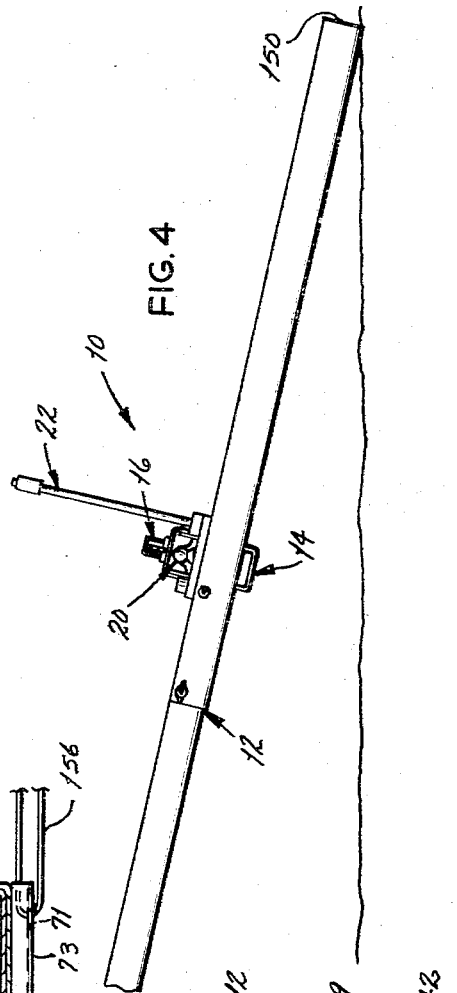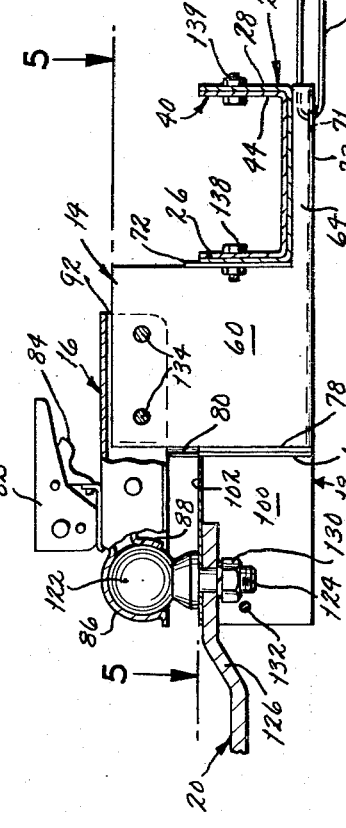

MOTORCYCLE CARRIER

This invention is directed to new and useful improvements in auxiliary carrying devices for motor vehicles and more particularly to a novel motorcycle carrier attachment for a motor vehicle.

Most known motorcycle carriers comprising a motorcycle support platform are secured with tools to the rear portion of a motor vehicle near a trunk or rear door. To prevent loss or theft of the carrier when it is not being used, as well as to permit temporary access to the rear door or trunk of the motor vehicle, it is often necessary to detach the support platform from the motor vehicle. The use of tools for this purpose can be a bothersome inconvenience.

Among the several objects of the present invention may be noted the provision of a novel motorcycle carrier having a novel motorcycle support assembly that can be attached to and detached from a motor vehicle without the use of tools; a novel motorcycle carrier having a novel motorcycle support assembly storable in the trunk of an automobile; a novel motorcycle carrier attachable to a standard trailer hitch; a novel motorcycle carrier that can support a motorcycle on a motor vehicle at a level that permits the driver of the motor vehicle a relatively unobstructed rear view; a novel motorcycle carrier having a novel motorcycle support assembly that pivots a loading and support member from an inclined position in contact with the ground to a substantially horizontal limit position parallel with the ground; a novel motorcycle carrier having a loading and support member which employs the weight of a motorcycle to establish a frictional drag force on the support member, thereby facilitating loading and unloading of the motorcycle on and off the support member; and a novel motorcycle carrier having a novel stop member for locating a loading and support member in a predetermined carrying position. Other objects and features will be in part apparent and in part pointed out hereinafter.

The present invention relates to a novel motorcycle carrier for automobiles, recreational vehicles or the like. In one embodiment, the invention comprises a loading and support member for holding a motorcycle, a first brace member rigidly connected to the loading and support member and a coupler member that is rigidly connected to the first brace member. The support, brace and coupler members thus form a rigid motorcycle support assembly that can be detachably secured to a hitch member on the motor vehicle by the coupler member. The coupler member is also arranged to pivot on the hitch member.

The invention further comprises a second brace member rigidly secured to the hitch member for contacting the first brace member after the support assembly is coupled to the hitch member. Contact between the first and second brace members is made at friction plaes respectively provided on each brace member.

Before a motorcycle is disposed on the loading and support member the support assembly is pivoted about the hitch member to an inclined position wherein one end of the loading and support member contacts the ground. The motorcycle is rolled onto the inclined loading and support member to a position wherein the center of gravity of the motorcycle is offset a predetermined distance from the hitch member. The hitch member functions as a fulcrum for the loading and support member such that the weight of the motorcycle causes the loading and support member to pivot about the hitch member to a predetermined horizontal carrying position.

The weight of the motorcycle also causes forcible contact to occur between the friction plates on the first and second brace members. The resulting frictional force between the friction members creates a drag on the support assembly that restrains pivotal seesaw movement of the loading and support member about the hitch member. Since this drag force must be overcome before the loading and support member and motorcycle can be pivoted in a seesaw manner about the hitch member, loading and unloading of a motorcycle on and from the support member is greatly facilitated.

After a motorcycle has been unloaded from the loading and support member the support assembly can be detached from the motor vehicle by manually unlatching the coupler member from the hitch member without the use of tools. The detached support assembly can then be stored in the trunk of a motor vehicle, the cab portion, or the like. Reattachment of the support assembly to the motor vehicle is also accomplished without the use of tools by manually latching the coupler member to the hitch member.

The invention accordingly comprises the constructions hereinafter described, the scope of the invention being indicated in the following claims.

In the accompanying drawings, in which several of various possible embodiments of the invention are illustrated, FIG. 1 is an exploded view with reference to a hitch member of a motorcycle carrier (fasteners removed) incorporating one embodiment of the present invention;

FIG. 2 is a front view thereof assembled;

FIG. 3 is a sectional view thereof taken on the line 3—3 of FIG. 2;

FIG. 4 is a front view thereof in an inclined loading position;

FIG. 5 is a sectional view thereof taken along the line 5—5 of FIG. 3; and

FIG. 6 is an enlarged fragmentary sectional view of another embodiment of the first brace member of the present invention.

Corresponding reference characters indicate corresponding parts through the several views of the drawings.

Figure 1:
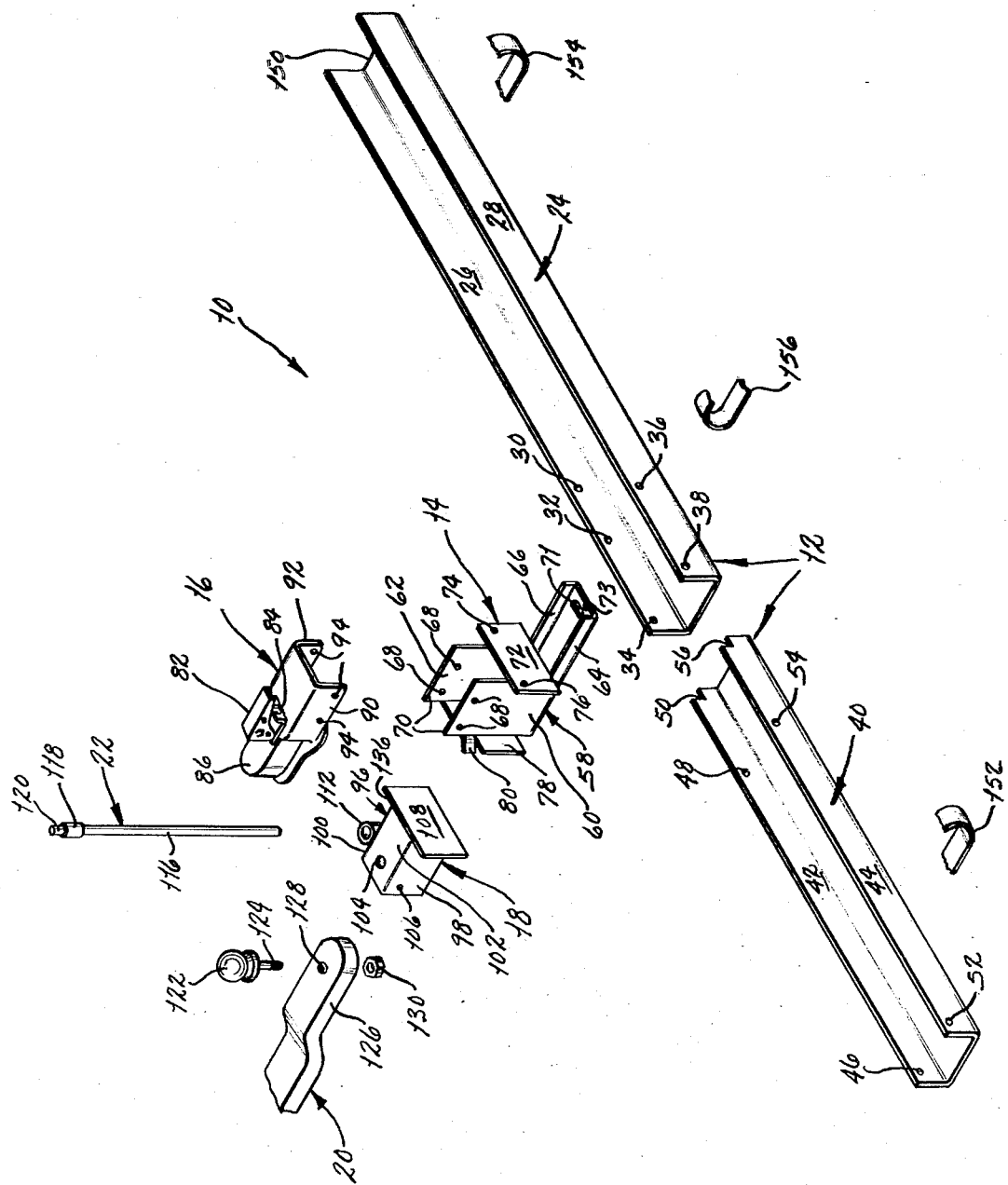

Referring now to the drawings, a motorcycle carrier 10 incorporates one embodiment of the invention. Motorcycle carrier 10 comprises an elongated loading and support member 12 secured to a first brace member 14. A coupler member 16 is also secured to first brace member 14 such that loading and support member 12, first brace member 14 and coupler member 16 are rigidly joined together to form a motorcycle support assembly.

Motorcycle carrier 10 further comprises a second brace member 18 secured to a standard hitch member 20. A stabilizer member 22 is detachably disposed in second brace member 18.

Loading and support member 12 comprises a first channel-shaped ramp member 24 formed of steel, for instance, or any other suitable material. It should be noted that substantially all the component parts of motorcycle carrier 10 are formed of steel, or an other suitable material, unless otherwise indicated. First ramp member 24 includes elongated oppositely disposed parallel sidwalls 26 and 28. Sidewall 26 is formed with fastener holes 30, 32 and 34 drilled therein whereas sidewall 28 is formed with fastener holes 36 and 38 respectively aligned with holes 32 and 34.

Loading and support member 12 further includes a second channel-shaped ramp member 40 telescopically engageable in first channel-shaped ramp member 24. Second ramp member 40 includes oppositely disposed parallel sidewalls 42 and 44. Sidewall 42 is provided with fastener holes 46, 48 and a corner cutout 50 that respectively align with fastener holes 52, 54 and corner cutout 56 provided in sidewall 44. It should be noted that the spacing between holes 32 and 34 in sidewall 26 is equivalent to the spacing between hole 48 and corner cutout 50 in sidewall 42. Similarly the spacing between fastener holes 36 and 38 in sidewall 28 is equivalent to the spacing between hole 54 and corner cutout 56 in sidewall 44.

First brace member 14 comprises an L-shaped channel member 5 having oppositely disposed broad flanges 60, 62 and oppositely disposed narrow flanges 64, 66. Each broad flange 60, 62 includes a pair of fastener holes 68, 68 provided therein at end portions 70, 70 thereof. An elongated aperture 71 is formed in a floor 73 of channel member 58 intermediate narrow flanges 64 and 66. First brace member 14 also includes a rectangular attachment plate 72 disposed edgewise on narrow flanges 64, 66 and welded to broad flanges 60 and 62. Attachment plate 72 includes spaced fastener holes 74 and 76 provided therein, the spacing therebetween being equivalent to the spacing between fastener holes 30 and 32 in sidewall 26 of first ramp member 24. First brace member 14 further includes a first friction plate 78 welded to broad flanges 60 and 62 in opposite relationship to attachment plate 72. First friction plate 78 includes a corner lip portion 80 bent away from broad flange 60.

Coupler member 16 is of the type manufactured by the Fulton Company, Milwaukee, Wis. and identified as a Trailer Coupling Assembly, part number 11–300. Coupler member 16 includes a latch handle 82, a catch piece 84 and socket portions 86 and 88. Coupler member 16 also includes oppositely disposed depending parallel coupler flanges 90 and 92 having a spacing therebetween that exceeds the spacing between broad flanges 60 and 62 of first brace member 14. Coupler flanges 90 and 92 each include a pair of fastener holes 94, 94 provided therein, the spacing therebetween being substantially equivalent to the spacing between holes 68, 68 in broad flanges 60 and 62 of first brace member 14.

Second brace member 8 comprises a U-shaped channel member 96 having oppositely disposed depending parallel sidewalls 98 and 100. Channel member 96 includes a web portion 102 having a fastener hole 104 therein and oppositely disposed aligned fastener holes 106, 106 provided in sidewalls 98 and 100. Second brace member 18 further includes a second friction plate 108 welded to sidewalls 98 and 100 such that plate 108 forms a closure at one end of U-shaped channel 96. Second brace member 18 also includes a steel tube 112 welded to sidewall 100. Tube 112 is sealed at one end by a washer 114 welded therein.

Stabilizer member 22 comprises a cylindrical rod 116 having any known cushioning material 118 bonded or otherwise attached to an end portion 120 of rod 116.

Hitch member 20 which is of any suitable known structure, includes a known coupler ball 122 having a threaded stem 124 depending therefrom and a known tongue portion 126 having a fastener opening 128 arranged to extend from the rear portion of a motor vehicle (not shown).

Motorcycle carrier 10 is assembled by aligning opening 104 of second brace member 18 with opening 128 of tongue portion 126. Stem 124 of coupler ball 122 is inserted through aligned fastener openings 104 and 128 and a nut 130 is threaded onto stem 124 to fasten second brace member 18 to hitch member 20. Any suitable known fastener 132 inserted in fastener holes 106 of second brace member 18 causes sidewalls 98 and 100 to hug tongue portion 126.

Coupler member 16 is mounted upon first brace member 14 such that fastener holes 94, 94, 94, 94 in coupler flanges 90 and 92 align with fastener holes 68, 68, 68, 68 in broad flanges 60 and 62. Coupler member 16 is then loosely fastened to first brace member 14 by any suitable known fasteners 134, 134.

With coupler member 16 loosely fastened to first brace member 14, coupler member 16 is latched onto coupler ball 122 such that first friction plate 78 confronts second friction plate 108. A slight adjustable clearance is provided between fasteners 134 and fastener holes 68, 68, 68, 68 and 94, 94, 94, 94 such that first brace member 14 can be moved relative to coupler member 16 toward second brace member 18 until first friction plate 78 is in substantial contact with second friction plate 108 and lip portion 80 on first friction plate 78 overlays an upper edge 136 of second friction plate 108. Fasteners 134, 134 are then tightened to form a rigid joint between coupler member 16 and first brace member 14. In this manner a desired surface contact between first and second friction plates 78 and 108 is established when coupler member 16 is latched onto hitch member 20.

First ramp member 24 is disposed on narrow flanges 64 and 66 such that fastener holes 30 and 32 in sidewall 26 align with fastener holes 74 and 76 in attachment plate 72. Fasteners 138 and 140 secure first ramp member 24 to attachment plate 72 and a fastener 139 is provided in hole 36. Second ramp member 40 is then telescoped into first ramp member 24 such that holes 48 and 54 in sidewalls 42 and 44 align with holes 3 and 38 in sidewalls 26 and 28 of first ramp member 24. Any suitable known thumb screws 142 and 144 inserted in the aligned holes fasten second ramp member 40 to first ramp member 24. when second ramp member 40 is thus secured to first ramp member 24 corner cutout portions 50 and 56 align with and partially frame fasteners 138 and 139 to prevent pivotal movement of second ramp member 40 away from first ramp member 24 about a pivot axis defined by thumb screws 142, 144. An elongated bolt 146 of any suitable known structure extends across sidewalls 42 and 44 of second ramp member 40 and is secured in holes 46 and 52 by a nut 148.

In using motorcycle carrier 10 the loading and support assembly comprising coupler member 16, first brace member 14 and loading and support member 12 is coupled to hitch member 20. This is accomplished by depressing catch piece 84 of coupler member 16 and pivoting latch handle 82 in a counterclockwise direction with reference to FIG. 3 to diverge socket portion 88 from socket portion 86. Socket portions 86 and 88 can then fit around coupler ball 122. Latch handle 82 is then pivoted in a clockwise direction with reference to FIG. 3 causing socket portion 88 to converge toward socket portion 86 thereby forming a socket joint on coupler ball 122.

With the loading and support assembly thus mounted upon hitch member 20 there is sufficient clearance between socket portions 86,88 and coupler ball 122 to permit seesaw pivotal movement about coupler ball 122 of coupler member 16, first brace member 14 and loading and support member 12. Coupler ball 122 thus functions as a fulcrum for loading and support member 12.

Loading and support member 12 is pivoted in a clockwise direction with reference to FIG. 2 until an end portion 150 of first ram member 24 contacts the ground as shown in FIG. 4. A motorcycle (shown in partial schematic outline in FIG. 2) is then rolled forwardly onto first ramp member 24 and second ramp member 40. As is well known the weight of the motorcycle is concentrated at its center of gravity. Ramp members 24 and 40 can thus be made in predetermined lengths that permit positioning of the motorcycle thereon such that the center of gravity of the motorcycle is offset a predetermined amount from hitch member 20 such as indicated by the arrow labeled C.G. in FIG. 2. This predetermined offset is obtained by maintaining a front wheel 149 of the motorcycle butted against bolt 146. Once the center of gravity of the motorcycle is moved past hitch member 20 the weight of the motorcycle will cause loading and support member 12 to pivot about hitch member 20 in a counterclockwise direction with reference to FIG. 4. This counterclockwise movement will stop when loading and support member 12 is disposed in a limit position substantially parallel to the ground. The limit position is predetermined by the engagement of corner lip portion 80 with upper edge 136 of second friction plate 108. The moment produced on loading and support member 12 by the weight of the motorcycle thereon maintains corner lip portion 80 in contact with upper edge 136.

As previously mentioned first friction plate 78 makes surface contact with second friction plate 108 when coupler member 16 couples first brace member 14 and support member 12 to hitch member 20. The weight of the motorcycle on support member 12 during motorcycle loading and unloading tends to pivot first brace member 14 about hitch member 20 toward second brace member 18 thereby establishing forcible contact between first friction plate 78 and second friction plate 108. Consequently as support member 12 is pivoted in a seesaw fashion about hitch member 20 first friction plate 78 rubs against second friction plate 108 creating a frictional drag force on loading and support member 12. The drag force which is proportional to the weight of the motorcycle acts in a direction opposite to the direction that support member 12 is being pivoted. The drag force thus facilitates loading and unloading of the motorcycle on and off support member 12 by restraining free pivotal movement of support member 12 about hitch member 20.

When the motorcycle is in a carrying position on loading and support member 12 and front wheel 149 abuts bolt 146 and corner lip portion 80 of first friction plate 78 engages upper edge 136 of second friction plate 108, a pair of any suitable known strap members 152 and 154 can be respectively strapped in a known manner through front motorcycle wheel 149, a rear motorcycle wheel 151 around opposite end portions of support member 12 and clipped or fastened in any suitable known manner to the bumper for instance of the motor vehicle. Straps 152 and 154 thus help maintain support member 12 in a horizontal position.

The motorcycle is stabilized in an upright position on loading and support member 12 by inserting stabilizer member 22 into tube 112 and employing any suitable known third strap member 156 for securing purposes. Strap member 156 which is anchored in aperture 71 of first brace member 14 by any suitable known securing device (not shown) is strapped against the motorcycle in any suitable known manner and around stabilizer member 22. The motorcycle bears against cushion 118 on stabilizer member 22 when strap member 156 has been tightly secured around tabilizer rod 116. Under this strap securing arrangement the motorcycle is immovably secured to loading and support member 12.

To unload the motorcycle from motorcycle carrier 10 straps 152,154 and 156 are removed and loading and support member 12 is pivoted in a clockwise direction with reference to FIG. 2 about hitch member 20. The frictional drag force between first and second friction plates 78 and 108 due to the motorcycle weight restrains free pivotal movement of loading and support member 12 until end portion 150 contacts the ground and the motorcycle is removed. Support member 12 can them pivot substantially freely about hitch member 20.

When carrier 10 is not being used to transport a motorcycle, coupler member 16 can be detached from hitch member 20 as previously described and second ramp member 40 can be detached from first ramp member 24 by removing thumb screws 142 and 144. Coupler 16, first brace member 14 and first and second ramp members 24 and 40 can then be stored in an automobile trunk or other convenient location.

As will be apparent to those skilled in the art loading and support member 12 can be formed in one piece but is preferably composed of two ramp members 24 and 40 to facilitate storage of the motorcycle support assembly in the trunk of a motor vehicle or on the cab floor or elsewhere. It will be further apparent that structure such as corner lip portion 80 for stopping pivotal movement of loading and support member 12 can be disposed elsewhere on first friction plate 78 such as shown in the embodiment of FIG. 6 wherein a first friction plate 160 is provided with a cutout portion 162 at a lower corner thereof and a second friction plate 164, disposed behind first friction plate 162 is shown in dotted outline. It will also be apparent that tolerance allowances at holes 68 in first brace member 14 for adjustment of coupler member 16 on brace member 14 during assembly thereof are provided to compensate for tolerance allowances in standard hitch member 20 and standard coupler member 16. This obtains the desired surface contact between first friction plate 78 and second friction plate 108 when coupler 16 couples the motorcycle carrier assembly to hitch member 20.

Some advantages of the novel invention evident from the foregoing description include a motorcycle carrier having a support assembly that can be attached to and detached from a motor vehicle without the need for tools. The detachable support assembly is of compact structure and can thus be stored in the trunk or cab portion of a motor vehicle. A further advantage is that the motorcycle carrier can be attached to a standard trailer hitch. Another advantage is that the motorcycle carrier uses the weight of the motorcycle to create a frictional drag force on the loading and support member thereby facilitating motorcycle disposition on and motorcycle removal from the carrier. Additional advantages of the motorcycle carrier include a pivot stop structure such as corner lip portion 80 for stopping pivotal movement of support member 12 when it is substantially parallel to the ground. Still another advantage is that the structure of motorcycle carrier 10 maintains loading and support member 12 at a level that enables the driver of a motor vehicle to have a substantially unobstructed rear view when a motorcycle is being transported on carrier 10.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A motorcycle carrier for attachment to a motor vehicle at hitch means provided on said motor vehicle, said motorcycle carrier comprising support means for holding a motorcycle, a first brace member connected to said support means, means for coupling said first brace member to said hitch means such that said first brace member is pivotally movable about said hitch means, and a second brace member secured to said motor vehicle for contact with said first brace member when said coupling means has coupled said first brace member to said hitch means, said contact between said first and second brace members limiting pivotal movement of said first brace member about said hitch means in a first direction toward said second brace member, while simultaneously permitting sliding contact between the first and second brace members as the first brace member and support means swing about said hitch means in a second direction normal to the first direction.

2. A motorcycle carrier as claimed in claim 1 wherein said second brace member is secured to said motor vehicle at said hitch means.

3. A motorcycle carrier as claimed in claim 1 wherein said coupling means is rigidly connected to said first brace member and coupled to said hitch means such that said first brace member and said coupling means are jointly movable about said hitch means.

4. A motorcycle carrier as claimed in claim 3 wherein said support means comprise an elongated ramp member secured to said first brace member for joint movement with said first brace member and said coupling means about said hitch means, said ramp member being pivotable to an inclined position wherein one end of said ramp member is in contact with the ground, said ramp member being pivotable from said inclined position to a first limit position wherein said ramp member is substantially parallel with the ground.

5. A motorcycle carrier as claimed in claim 4 wherein one of said brace members include a stop member engageable with the other said brace member when said ramp member is in said first limit position, said engagement limiting further ramp movement beyond said first limit position away from said inclined position.

6. A motorcycle carrier as claimed in claim 5 wherein said hitch means is a fulcrum for said ramp member and said ramp member is of a predetermined length to permit positioning of said motorcycle on said ramp member such that the center of gravity of said motorcycle is offset a predetermined amount from said hitch means such that the weiht of said motorcycle causes a resultant moment on said ramp member about said hitch means that maintains said ramp member in said first limit position whereby said stop member and said other said brace member are forcibly engaged.

7. A motorcycle carrier as claimed in claim 3 wherein said first and second brace members respectively include oppositely disposed first and second friction members, contact between said first and second brace members causing said first and second friction members to bear against each other.

8. A motorcycle carrier as claimed in claim 7 wherein said first brace member is pivotable about said hitch means in opposite directions substantially parallel to said second friction member, said support means being secured to said first brace member such that said first brace member, said support means and said coupling means jointly move in one of said opposite directions when the motorcycle is loaded onto said support means, said first brace member and said coupling means jointly moving in the other said opposite direction when said motorcycle is unloaded from said support means, the weight of said motorcycle on said support means forcing said first friction member against said second friction member.

9. A motorcycle carrier as claimed in claim 8 wherein said support comprise comprie an elongated ramp member pivotable about said hitch means between a first limit position wherein said ramp member is substantially parallel to the ground and a second inclined position wherein one end of said ramp member contacts the ground, said first and second friction members being in forcible contact when said motorcycle is on said ramp member and said one end of said ramp member is spaced from the ground.

10. A motorcycle carrier as claimed in claim 9 wherein one of said brace members include a stop member engageable with the other said brace member when said ramp member is in said first limit position, engagement of said stop member with the other said brace member preventing the other said brace member and said ramp member from being moved in said one of said opposite directions beyond said first limit position.

11. A motorcycle carrier as claimed in claim 9 wherein said ramp member is detachably secured to said first brace member.

12. A motorcycle carrier as claimed in claim 1 wherein said coupling means are detachably secured to said first brace member and include latch means for detaching said coupling means from said hitch means.

13. A motorcycle carrier as claimed in claim 1 wherein said support means comprise a pair of channels, one end portion of one of said channels being detachably secured to one end portion of the other said channel such that said one channel forms a continuation of the other said channel.

* * * * *

UNITED STATES PATENT OFFICE
CERTIFICATE OF CORRECTION

Patent No. 3,805,984  Dated April 23, 1974

Inventor(s) Gail B. Schwarz and James F. Friederich

It is certified that error appears in the above-identified patent and that said Letters Patent are hereby corrected as shown below:

Column 1, line 58, "plaes" should read -- plates --.
Column 3, line 22, "channel member 5" should read -- channel member 58 --;
Column 3, line 54, "member 8" should read -- member 18 --.
Column 4, line 48, "holes 3" should read -- holes 34 --;
line 52, "when" should read -- When --.
Column 5, line 18, "ram" should read -- ramp --.
Column 6, line 19, "tabilizer" should read --stabilizer --.
Column 8, line 10, "weiht" should read -- weight --.
line 36, "comprise.comprie an" should read -- comprise an --.

Signed and sealed this 10th day of September 1974.

(SEAL)
Attest:

McCOY M. GIBSON, JR.
Attesting Officer

C. MARSHALL DANN
Commissioner of Patents